(No Model.)
G. HAMBRUCH.
MEANS FOR PRODUCING A VACUUM.
No. 323,325. Patented July 28, 1885.
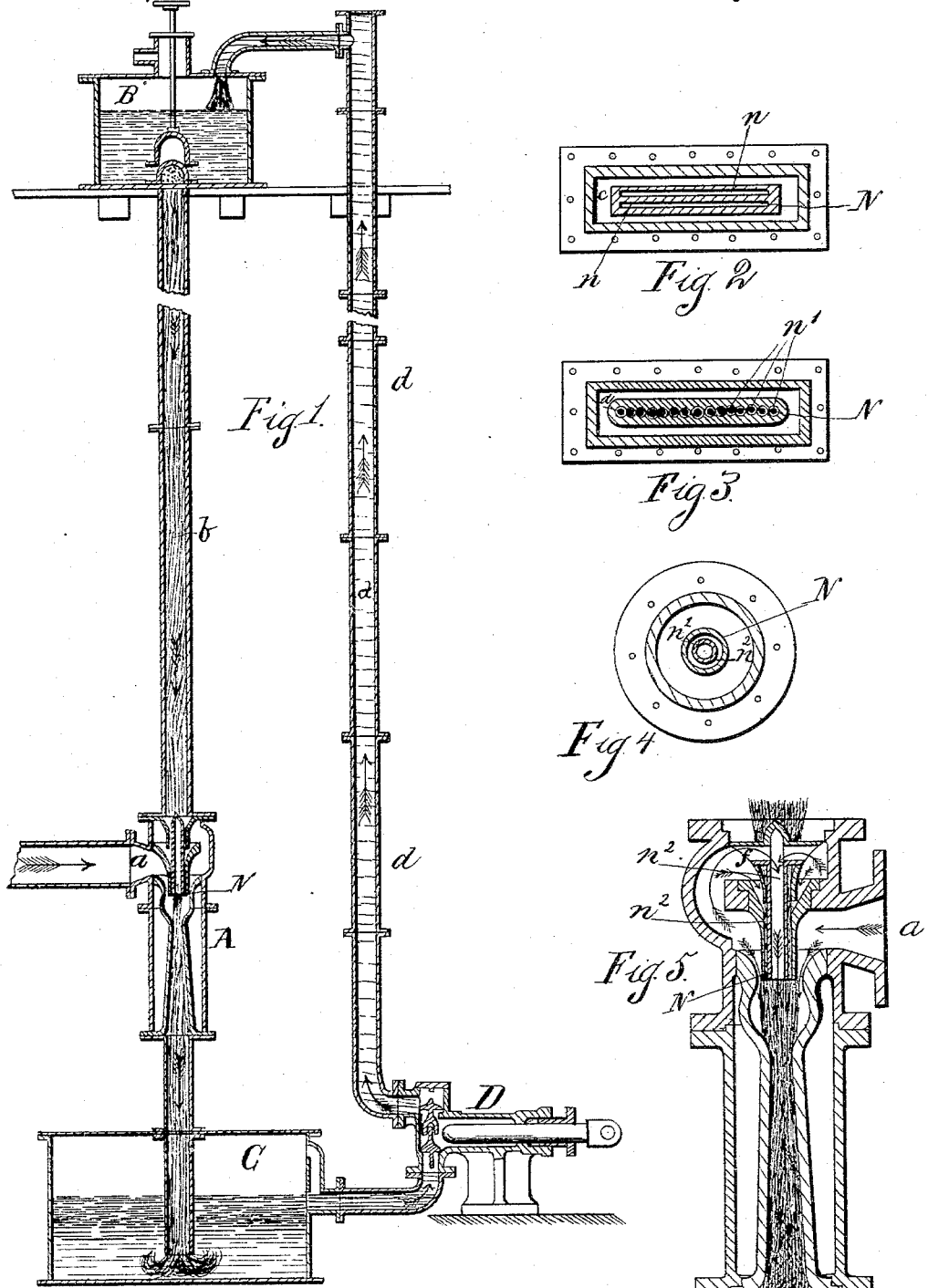

UNITED STATES PATENT OFFICE.

GUSTAV HAMBRUCH, OF BERLIN, GERMANY.

MEANS FOR PRODUCING A VACUUM.

SPECIFICATION forming part of Letters Patent No. 323,325, dated July 28, 1885.

Application filed September 6, 1884. (No model.) Patented in Germany June 22, 1884, No. 30,491; in France July 25, 1884, No. 163,492; in England August 21, 1884, No. 11,485; in Belgium October 21, 1884, No. 66,650; in Italy December 6, 1884, XXXIV, 456, and in Spain March 6, 1885, No. 4,507.

*To all whom it may concern:*

Be it known that I, GUSTAV HAMBRUCH, engineer, a subject of the King of Prussia, residing at 21 Behrenstrasse, Berlin, Prussia, German Empire, have invented certain new and useful Improvements in the Method of Producing Low Temperatures by Means of a Vacuum in the Manufacture of Ice, or for other purposes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the production of cold by rarefaction of the air in a close chamber or vessel—that is to say, by producing in said chamber or vessel a vacuum of high degree, as, for instance, in the freezing chamber or chambers of an ice-machine, in which the required temperature is obtained by extracting the air from the said chamber and eliminating therefrom its moisture.

The invention is also applicable to other purposes—as, for instance, for producing a vacuum in vacuum-pans in the manufacture of sugar, or for other purposes.

In the production of cold by rarefaction of the air in a closed chamber or vessel, it has been the custom to facilitate the production of the vacuum to bring the air drawn from the chamber or vessel by the suction apparatus in contact with a water-absorbing liquid—as, for instance, sulphuric acid—to extract the moisture from the air. Notwithstanding the aid derived from the use of the water-absorbent, it has been found absolutely necessary to employ coacting suction-pumps in order to obtain a practically complete vacuum or a vacuum of high degree. Such an apparatus is necessarily complicated and is not materially simplified when one of the two pumps is operated by an injector, as has been proposed.

My invention has for its object a simple method of producing this vacuum and thereby lowering the temperature to the required degree by means of a jet of water-absorbing liquid, whereby the air is drawn directly from the chamber or vessel in which said vacuum is to be produced, and with which jet said air is brought into contact to extract therefrom its moisture. Such a method has a twofold object. Not only is the vacuum produced thereby, but the moisture in the air drawn from the chamber or vessel is simultaneously absorbed or extracted, which materially simplifies the means usually employed for this purpose.

A still greater and more important advantage is, however, derived from this method, in that a more complete elimination of the aqueous vapors drawn from the chamber or vessel is effected than is the case when said vapors are brought in contact with the mechanically-agitated absorbing-liquid in an absorbing apparatus of usual construction. This absorbing effect may be materially increased by employing an injector-nozzle having an extended injecting-area—as, for instance, a nozzle having a slitted ejecting-orifice. Good results are, however, obtained from ordinary injectors, and in experiments made by me I have found that with my improved method I am enabled to produce almost an absolute vacuum in a vessel of a given capacity within about two minutes—an operation requiring, by the method and means heretofore resorted to, at least thirty minutes.

The general arrangement of an apparatus working according to my improved method consists, essentially, in supplying the water-absorbing fluid to the injector under sufficient pressure and in connecting the suction-chamber of the injector directly with the space in which the vacuum is to be produced. To this end it will be found convenient to locate the reservoir containing the liquid water-absorbent at a sufficient height above the injector-nozzle, to which reservoir said liquid is returned by a suitable pump. In this manner a circulation is established, whereby I am enabled to cool the absorbing liquid when it becomes heated. I have found that the operation of the apparatus is not materially affected even when the liquid has absorbed fifty per cent. of its own volume of water. It is therefore obvious that during the operation a portion of the absorbing liquid may be continuously diverted from the apparatus, freed from its absorbed aqueous constituents by evaporation, and again returned thereto, so that the action of the liquid will not be affected.

Any suitable water-absorbing agent may be employed—such, for instance, as sulphuric acid, soda lye, and other concentrated solutions of the caustic alkalies or alkaline earths, or any other liquid having a great affinity for water either by absorbing the same or entering into chemical combinations therewith.

The apparatus for carrying out my new method of producing a vacuum may be greatly varied in its general construction and arrangement without departing from the essential requirements in its function; and in the accompanying drawings I have shown a construction and arrangement of apparatus that will answer the purposes in view.

Figure 1 is a vertical section of the apparatus. Figs. 2, 3, and 4 are transverse sections showing various constructions of the injector-nozzle, and Fig. 5 is a vertical section of a modified form of injector.

The injector A is connected by a suitable pipe, $a$, with the vessel or space in which the vacuum is to be produced, and by means of a stand-pipe, $b$, with the reservoir B that contains the water-absorbing liquid. It will be seen that when the liquid from B is allowed to pass through the injector the air or vapors, or combined air and gases or vapors, are drawn through pipe $a$ from the space or vessel in which the vacuum is to be produced, and are brought into intimate contact with the jet or jets of absorbing liquid, whereby the aqueous vapors are absorbed. The absorbing liquid may be directly taken from the injector as it leaves the same and conducted or forced back to the reservoir B; or it may be allowed to pass into a reservoir, C, and by means of a force-pump, D, forced back into the reservoir B through a pipe-connection, $d$.

As above stated, the liquid, in its circulation from the reservoir B through the injector and back again to said reservoir, may be subjected to a cooling agent and cooled whenever it becomes heated by the absorbed gases or vapors, and such liquid may be freed from its aqueous constituents by evaporation by diverting the circulation to and from a suitable evaporating apparatus, so that the liquid may not only be maintained at a given temperature, but at a given degree of concentration, to obtain the best results.

Of course it will be understood that several such apparatus may be arranged for co-operation by any suitable juxtaposition of the same.

In the use of the apparatus for evaporating liquids at a low temperature it will be found of great advantage to construct the ejector-orifice of the injector-nozzle N so as to provide an extended superficial area, in order to obtain an extensive surface of liquid with which the air or gases are brought in contact, and thereby accelerate the absorption of the aqueous components of such air or gases. This may be effected in various ways, either by employing an ejector-nozzle of the form shown in Fig. 2, where the nozzle has an orifice composed of two narrow and extended slits, $n\ n$, or by multiplying the jets, as in Fig. 3, where the nozzle is shown as composed of a series of ejection-orifices $n'\ n'$, forming practically a compound nozzle. The interior passage of these orifices may have any suitable form in cross-section, either cylindrical, polygonal, or other suitable form. As an example, I have shown in Figs. 4 and 5 nozzles composed of concentric passages $n^2\ n^2$, the path of the air or gases drawn in at $a$ being indicated by arrows in Fig. 5. As shown in the latter figure, the gases drawn in at $a$ are not only brought in contact with the outer surface of the liquid-cylinders, but also with their inner surfaces, the liquid being ejected in concentric tubular jets.

It is obvious that the described mode of producing a vacuum may be applied to other purposes than those set forth—as, for instance, for cooling liquids, in the manufacture of ice, in the production of currents of cold air, and other purposes.

I would have it understood that I do not desire to limit myself to any specific construction or arrangement of apparatus, as this may be varied according to the purposes for which such apparatus is used without in any way departing from the nature of my invention; but

What I claim is—

1. The herein-described mode of producing a vacuum, which consists in exhausting the air from a close chamber or vessel by suction through the medium of a jet of a liquid water-absorbent acting to draw the air directly from said chamber or vessel and bringing said air in direct contact with the jet, substantially as described, for the purpose specified.

2. The herein-described mode of producing a vacuum, which consists in exhausting the air from a close chamber or vessel by suction through the medium of a jet of a liquid water-absorbent acting to draw the air directly from said chamber or vessel, converting the jet into spray, and bringing said air in direct contact with the sprayed liquid, as described, for the purpose specified.

In testimony whereof I affix my signature in presence of two witnesess.

GUSTAV HAMBRUCH.

Witnesses:
  A. DEMELIUS,
  B. ROI.